June 27, 1933.  G. B. LAUTZ, JR  1,915,956
INKWELL
Filed Dec. 12, 1932

INVENTOR.
George B. Lautz, Jr.
by Parker, Crocknow & Farmer
ATTORNEYS.

Patented June 27, 1933

1,915,956

UNITED STATES PATENT OFFICE

GEORGE B. LAUTZ, JR., OF BUFFALO, NEW YORK

INKWELL

Application filed December 12, 1932. Serial No. 646,822.

This invention relates to improvements in inkwells formed of separable members and which are particularly adapted for use in connection with school desks. These inkwells are mounted in a hole in the desk top, the members being inserted therein and secured together in various ways for preventing the unauthorized removal or theft of the inkwells. In some of these inkwells, as heretofore constructed, the members are secured together by means of rotary or threaded connections, or by the use of locking dogs requiring a key for locking the parts together, and in other ways. Obviously, such constructions require considerable manipulation and consume considerable time and labor in installing the inkwells.

Some objects of the invention are to provide a novel and improved inkwell of the sort mentioned in which the members may be coupled together and securely locked in place by a direct endwise and non-rotative engagement of the sections, without the use of keys or devices; also to provide an inkwell of this kind comprising few, relatively simple and inexpensive parts and which is of strong and rugged construction; with which leakage of ink out of the well member into the other parts of the inkwell is prevented; also to provide an inkwell having an ink receiving member of novel form, the use of which aids in preventing unauthorized removal of the inkwell, and which reduces to a minimum the breaking of inkwells when struck by books or objects in, or introduced into, a desk in which the inkwell is used; and also to construct an inkwell having locking means including yielding parts which permit instant coupling of the members together by direct endwise engagement in one direction, and in which movement in any opposite direction to disengage the members is positively prevented except by the use of a key or similar device.

Various other objects and advantages will be apparent from the following description of the invention, and the novel features thereof will be pointed out in connection with the appended claims.

Figure 1:
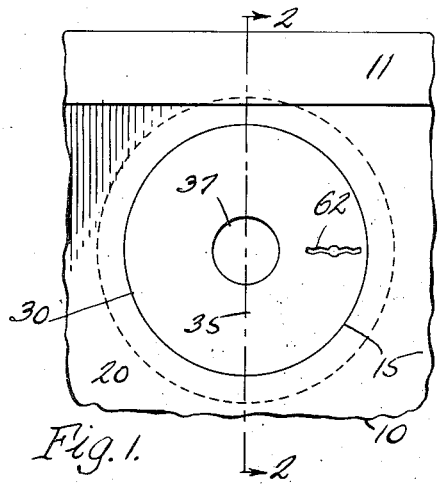
Fig. 1 is a plan view of a portion of a desk top having a hole in which one of my improved inkwells is operatively arranged.

Desk tops at the present time are generally provided with an upright hole of substantially standard size. Such holes may be either tapered inwardly in a downward direction or of cylindrical form with a reduced seat. The inkwell illustrated in Figs. 1 to 4 is constructed for use with holes of the latter form, while that shown in Fig. 8 may be used with holes of the first mentioned form. The desk top can be of any usual or standard construction. That shown in the drawing comprises a rear, substantially horizontal top wall or part 10 having an upstanding rear flange or bead 11, a vertical wall 12 depending from the rear edge of the desk top 10, and forming the back wall of the usual desk compartment 13, and at the front edge of the top 10 is disposed the hinged lid or member 14. The desk top 10 in Figs. 1–4 is provided with the upright hole 15 of cylindrical formation, extending therethrough from the top face 20 of the desk top to the lower face 21 thereof, and preferably having adjacent the face 21 a narrow, annular seat or inwardly extending shoulder 22.

Figure 8:
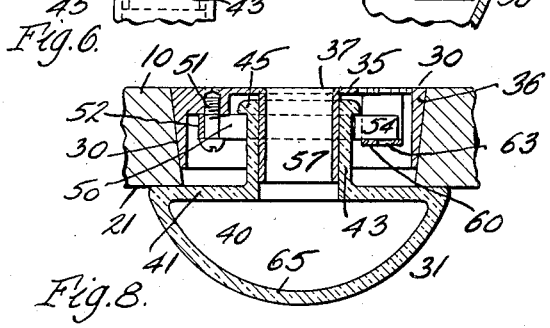
Fig. 8 is a sectional elevation showing an inkwell having an upper member of slightly modified form.

The hole shown in the construction of Fig. 8 is continuously tapered inwardly in a downward direction from the top face 20 to the bottom face 21 of the desk top 10, and does not require the shoulder 22, since the hole itself acts as a seat.

In accordance with this invention, my improved inkwell comprises a top member 30, a bottom, ink receiving member 31, and locking or coupling means 32 for securing the members together.

The top member 30 includes a flat, substantially circular wall or plate portion 35 having a marginal, depending, annular flange 36 formed to fit in the hole 15 in the desk top 10. In the construction illustrated in Figs. 1–4, the flange 36 is cylindrical and its lower edge rests upon the shoulder 22 to limit the inward movement of the member 30 and prevent it from passing through the hole 15, while in Fig. 8 this condition is obtained by making the flange 36 of corresponding taper to that of the tapered hole, as shown. The top wall or plate 35 of the section 30 is preferably disposed flush with the top face 21 of the desk top in both constructions, and is provided with a central hole 37 for affording access to the ink.

The hole in the desk top could, if desired, be of other than circular form, and the top member 30 could be correspondingly modified without departing from the scope of the invention.

Figure 2:
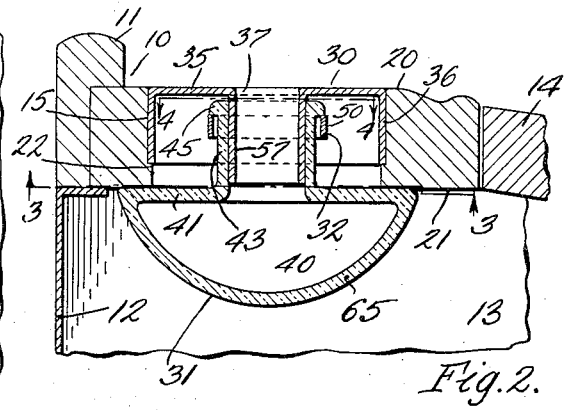
Fig. 2 is a vertical, sectional elevation of the desk top and inkwell, on line 2—2, Fig. 1.

The bottom or ink receiving member 31 of the inkwell includes a relatively large and, preferably, rather shallow body or well portion 40 having a flat, horizontal top wall 41 which is of greater dimensions than that of the hole 15 in the desk top so that it may be positioned with said wall 41 extending across the hole with the marginal portions of the wall in closely abutting relation to the bottom face 21 of the desk top, as shown clearly in Fig. 2.

The member 31 is further provided with a supporting portion preferably in the form of a cylindrical neck 43 extending upwardly from the central portion of the wall 41 and communicating with the interior of the body portion 40. When the parts are assembled, this neck 43 projects upwardly into the central portion of the hole in the desk top in spaced and preferably concentric relation to the marginal flange 36 of the top member 30, and in alinement with the hole 37 in the top wall 35. The upper edge of the neck 43 is formed with a lateral extension, preferably in the form of a bead 45, which cooperates with the locking means 32 for retaining the members 30 and 31 operatively connected together in position in the hole 15 in the desk top, as will be explained.

This member 31 is preferably made integrally of a single piece, while the top section 30 may be made of metal, such as a single sheet metal stamping. The members 30 and 31 of the inkwell can, of course, be made in more than one piece, if desired.

The coupling means 32 for locking the members 30 and 31 together in operative relation to the desk top 10, as shown in the drawing, comprises a pair of opposed curved spring leaves 50 or other yielding parts supported upon the member 30 by means of a screw or stud 51 connecting an end of each of the leaves to the lower face of the top wall 35 of said member in spaced and preferably parallel arrangement thereto. In the construction illustrated, the two leaves 50 are formed of a single piece of relatively thin, flat, spring material, such as steel or the like, which is provided intermediate its ends with a loop 52 through which said screw or fastening device 51 passes. The leaves 50 are of substantially semi-circular form with their centers of curvature disposed in slightly offset or eccentric relation to the axis of the neck or connecting portion 43 of the member 31 when the latter is in its operative position.

Figure 4:
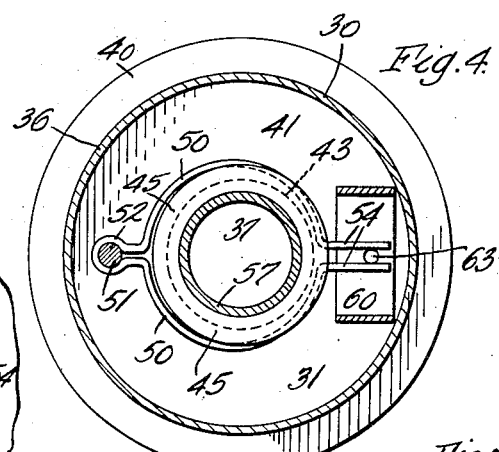
Fig. 4 is a horizontal, sectional plan thereof on line 4—4, Fig. 2.

The free extremities of the leaves 50 are offset to form a pair of lateral extensions 54 which, when the parts are in locking position, extend adjacent to and in substantially parallel relation with each other, as shown in Fig. 4.

Figure 6:
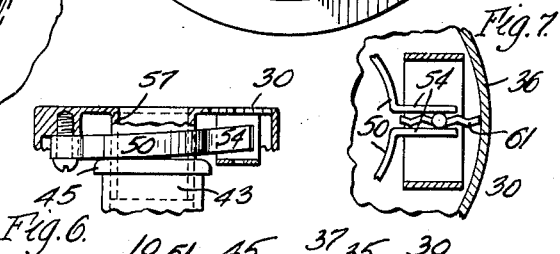
Fig. 6 is a fragmentary, sectional elevation showing the relation of the parts during the act of engaging the lower member of the inkwell with the upper member thereof when coupling the members together.

The diameter of the combined arcs of the two leaves 50 is normally a little greater than that of the cylindrical portion of the neck 43 and is somewhat less than that of the bead 45 thereof. The connecting or locking leaves 50, as shown, are arranged on edge with their greatest cross sectional dimension extending upwardly in parallel relation to the axis of the inkwell, and when it is desired to couple the members 30 and 31 together, the member 30 is first inserted into position from the upper end of the hole 15, the lower member 31 being then moved upwardly from beneath the top wall 10 so as to pass the neck portion 43 thereof into the hole in such a manner that the bead 45 will engage the lower edges of the spring leaves 50 intermediate the ends thereof. Since these leaves are of a yielding nature and are arranged on edge, as explained, the upper edge of the bead 45 of the member 31, which is preferably rounded, will cause the leaves 50 to be flexed in an upward direction, as shown in Fig. 6, thereby enabling the upper edge portion of the bead 45 to enter between and spread said leaves 50 apart and permit the bead 45 to pass between said leaves to the upper side thereof until the bead clears their upper edges. The leaves 50 will now snap back into their original form assuming a position beneath the bead 45 and loosely encircling the neck 43, thereby permitting the bead 45 to rest upon the upper edges of the leaves 50, as shown in Figs. 2, 4 and 8. The length of the neck portion 43 and the position of the leaves 50 is such that when this operation has been completed, the top face of the wall 41 of the well portion 40 will be in abutting relation to the lower face 21 of the desk top, as shown in Figs. 2 and 8.

In order to prevent downward movement of the member 31 with possible deflection and separation of the leaves 50 to a position in which the lower member 31 could be removed by an unauthorized person, the top member 30 is provided with a stop 60 which extends transversely of said member in position to engage with the lower edges to the lateral extensions 54 of the leaves 50. Thus, downward force exerted upon the member 31 in a direction to deflect the leaves 50 is resisted by said stop 60. This stop 60 is formed of a strip of metal having its ends bent upwardly and thence laterally, and secured by welding or the like to the bottom face of the top wall 35 of the member 30.

It will be understood from the foregoing description that the inkwell can be positioned and securely held against unauthorized removal by merely inserting the two members 30 and 31 into the hole 15 from its opposite ends, and upon the engagement of the bead 45 of the lower member 31 with the locking means, the latter is automatically actuated and the parts locked together.

Figure 3:
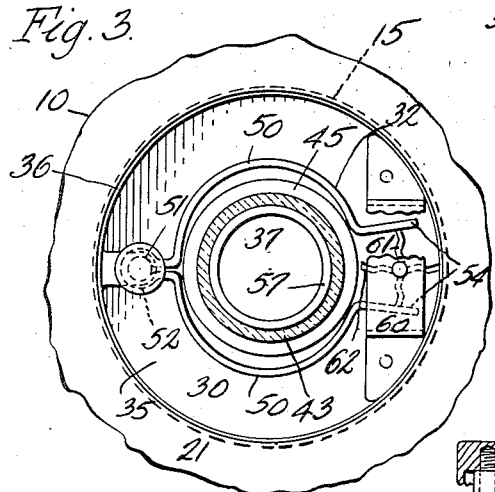
Fig. 3 is a bottom plan view, partly in section, taken on the line 3—3, Fig. 2, in the direction of the arrows in that figure.
Figure 7:
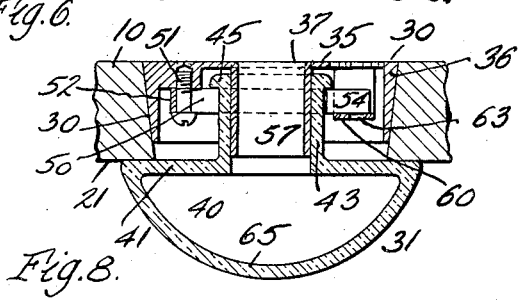
Fig. 7 is a fragmentary, sectional plan view showing parts of the locking mechanism in locked position, and a key or device which may be used to unlock the parts.
Figure 5:
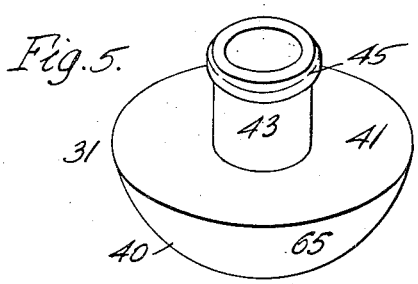
Fig. 5 is a perspective view of the lower or ink receiving member of the inkwell, detached.

It will also be understood that the removal of the members 30 and 31 may be effected by spreading the leaves 50 apart. This may be accomplished by means inserted between the extensions 54 of the leaves 50 in a manner to spread these apart as shown in Fig. 3. This may be accomplished by a suitable key 61, such as is shown in Fig. 7 which can be so positioned by inserting the same through a key hole 62 in the top wall 35 of the member 30 and then rotating the key through an angle of 90 degrees, as shown in Fig. 3. The stop 60 may be provided with a hole 63, as shown in Figs. 3, 4 and 8, for the reception of the lower end of the key to permit the same to be retained in proper operative relation to the locking means during the turning of the key.

In order to facilitate a proper operative engagement of the bead 45 with the spring leaves 50 and to maintain the lower section 31 in stationary, operative position and prevent the same from being tipped about its axis by the insertion of an object between the top face of the wall 41 of the member 31 and the bottom face 21 of the desk top, the members 30 and 31 are preferably provided with telescopic or other interengaging parts. In the example illustrated, the top member 30 is provided with a depending cylindrical tube or part 57 which is preferably formed integral with the top wall 35 of this member and is contiguous with the margin of the hole 37 in the center thereof. This tube or depending part 57 is of such dimensions as to fit snugly within the cylindrical neck 43 of the lower member 31, and the lower end of the part 57 extends well within the neck portion, preferably to a point near its lower end, as shown clearly in Figs. 2 and 8.

By providing this depending tube portion, which is disposed axially of the inkwell, the neck portion 43 can be guided in its upward or connecting movement so that the bead 45 will properly engage the locking leaves 50 when coupling the parts together, and after the parts have been so coupled, the stationary tube portion 57 will act in conjunction with the locking means to retain the lower member 31 in fixed position and will prevent it from being tipped in the manner explained.

As shown in the drawing, the lower or body portion 40 of the ink-receiving section 31 is formed with a continuously curved or convex wall 65 depending from the periphery or edge of the top wall 41 thereof so as to form therewith a body portion of substantially spherical segmental shape.

By forming the body of the ink-receiving member in this manner, breakage of the member 31 is materially reduced, since books or other objects in, or inserted into, the compartment 13 of the desk and striking against the inkwell will be deflected by the curved or cam-like surface of the lower wall 65 thereof.

Another advantage gained by thus forming the body portion of the inkwell is that such a surface affords a very slight and insecure hold to anyone attempting to grasp the lower member 31 in an attempt to remove the same. Thus the form of the lower member further aids or cooperates with the stop 60 in preventing the theft or unauthorized removal of the inkwell. While the lower wall 65 is preferably made in the form of a continuous curve producing a convex surface, the shape thereof may be modified to some extent without reducing its usefulness for the purpose described.

All school desks have been made with apertures of either of the two types illustrated in Figs. 2 and 8, and consequently, it is only necessary to supply the outer edge portions of upper parts of the ink well in two forms, the ink containing receptacles being the same for both forms. The ink well described is, therefore, applicable to practically all school desks now in use, without requiring any changes in the desks.

I claim:

1. An inkwell comprising a bottom well member, a top member, and a locking snap connection between said members for coupling said members together and operable by an endwise, non-rotative movement of one of said members toward the other.

2. An inkwell constructed to be supported in a hole in a desk top or the like, said inkwell comprising a bottom member formed to engage a lower face of said desk top to prevent passage of said member upwardly through said hole, a top member formed to be inserted downwardly into said hole and engageable with said desk top so as to limit its downward movement, and a snap connection for coupling said members together in said hole and operable by an endwise, non-rotative movement of one of said members toward the other.

3. An inkwell constructed to be supported in a hole in a desk top or the like, said inkwell comprising a bottom member including a body formed to abut against a bottom face of said desk top, a reduced neck thereon insertable upwardly into said hole, a top member formed to be inserted downwardly into said hole and engageable with said desk top, a depending tubular portion thereon formed to telescopically engage with said neck of said bottom member, and locking means on said top member operatively engageable about said neck to releasably connect said members together and retain said inkwell in position in said hole.

4. An inkwell comprising a bottom member having a hollow body for receiving the ink, a reduced neck extending upwardly therefrom, a top member having a depending tubular portion thereon formed to fit said neck of said lower member for alining said sections, and locking means on said top member engageable about said bottle neck to couple said members together.

5. An inkwell constructed to be supported in a hole in a desk top or the like, said inkwell comprising a bottle member having a relatively large ink-receiving body formed to depend below and about against a lower face of said desk top about said hole, a relatively small neck extending upwardly from said body into said hole, and a supporting member insertable downwardly into said hole and engageable with said desk top to prevent its downward movement through said hole, and locking means on said supporting member engageable about said bottle neck to couple said members together and maintain them in their stated relation to said desk top.

6. An inkwell constructed to be supported in a hole in a desk top or the like, said inkwell comprising a bottle member having a relatively large ink-receiving body formed with a substantially plane top wall engageable with a lower face of said desk top about said hole, and a bottom wall diverging downwardly from the periphery of said top wall towards the perpendicular axis of said member, a relatively small neck projecting upwardly from said top wall into said hole in said desk top, and a supporting member including a plate having a marginal flange formed to be inserted downwardly into said hole, said plate also having a depending tubular part which telescopically engages with said neck of said bottle member for alining said members, means for releasably connecting said members, and said diverging bottom wall of said bottle acting to deflect objects impinging thereagainst and thereby minimize the possibility of breaking said bottle member.

7. An inkwell for use in a hole in a desk top or the like, including a pendant bottle member having a relatively large and shallow ink-receiving body formed with a substantially plane top wall engageable with a bottom face of said desk top about said hole, an approximately convex wall diverging downwardly from the periphery of said top wall towards the perpendicular axis of said member, a reduced neck projecting upwardly from said top wall into said hole, and means engageable with said neck for securing and supporting said member in said pendant relation to said desk top, and said bottom wall of said body acting to deflect objects impinging thereagainst and thereby minimize the possibility of breaking said bottle member.

8. An inkwell constructed to be supported in a hole in a desk top or the like, said inkwell comprising a bottle member having a hollow body for receiving the ink and which is engageable against a lower face of said desk top about said hole, a neck extending upwardly from said body into said hole and having a laterally projecting part therein in spaced relation to said body, a top member insertable downwardly into said hole, and locking means thereon engageable about said bottle neck between said body and said projecting part, whereby the latter part cooperates with said locking means in preventing separation and removal of said members from said desk top.

9. An inkwell constructed to be supported in a hole in a desk top or the like, said inkwell comprising a top member and a bottom member formed to be inserted into said hole from the upper and lower sides respectively of said desk top, a laterally projecting part on one of said members and locking means on said other member comprising relatively thin, flexible spring leaves each supported at one end and arranged with their longest cross sectional dimension in parallel relation to the perpendicular axes of said members and which cooperate with said laterally projecting part to secure said members together.

10. An inkwell constructed to be supported in a hole in a desk top and comprising a bottom well member formed to engage a lower face of said desk top, a top member engageable in said hole from the upper face of said desk top, one of said members having a projecting part extending lengthwise into said hole, and means for connecting said members together comprising thin, flexible spring leaves each supported at one end on said other section and arranged in substantially annular relation to and with their longest cross sectional dimension in parallel relation with respect to the axis of said projecting part, and an enlargement on said projecting part, which, when one of said members is moved into operative relation to the other, engages and deflects said spring leaves in the direction of movement, enters between and spreads said leaves so as to pass therebetween and permit said leaves to snap back about said projecting part to couple said members together.

11. An inkwell constructed to be supported in a hole in a desk top and comprising a bottom, well member formed to engage a lower face of said desk top, a top member engageable in said hole from the upper face of said desk top, one of said members having a projecting part extending lengthwise into said hole, and means for connecting said members together comprising thin, flexible spring leaves each supported at one end on said other section and arranged in substantially annular relation to and with their longest cross sectional dimension in parallel relation with respect to the axis of said projecting part, an enlargement on said projecting part, which, when one of said members is moved into operative relation to the other, engages and deflects said spring leaves in the direction of movement, enters between and spreads said leaves so as to pass therebetween and permit said leaves to snap back about said projecting part to couple said members together, stop means positioned to engage said spring leaves to oppose deflection and consequent separation of said spring leaves by movement of said projecting part of said lower member in the opposite direction, thereby preventing removal of said inkwell, and said spring leaves being formed to be spread apart by a key to facilitate separation of said members.

12. An inkwell constructed to be supported in a hole in a desk top or the like, said inkwell comprising a bottle member having a hollow, ink-receiving body portion, a projecting part extending upwardly therefrom for insertion into said hole, a top member having means engageable with said projecting part for securing said upper and lower members together in operative relation to said hole, said body portion of said lower member being formed with a flat top wall engageable against said desk top, and a substantially convex bottom wall depending from the periphery of said top wall to thereby present a surface preventing sufficient hold upon said bottle member to force it out of holding relation with said other member.

13. An inwell constructed to be supported in a hole in a desk top and comprising a bottom, well member formed to engage the lower face of said desk top, a top member engageable in said hole from the upper face of said desk top, one of said members having a projecting part extending lengthwise into said hole, and means for connecting said members together comprising thin, flexible spring leaves each supported at one end on said other section and arranged in substantially annular relation to and with their longest cross sectional dimension in parallel relation with respect to the axis of said projecting part, an enlargement on said projecting part, which, when one of said members is moved into operative relation to the other, engages and deflects said spring leaves in the direction of movement, enters between and spreads said leaves so as to pass therebetween and permit said leaves to snap back about said projecting part to couple said members together, stop means positioned to engage said spring leaves to oppose deflection and consequent separation of said spring leaves by movement of said projecting part of said lower member in the opposite direction, and said bottom member having a substantially convex bottom wall extending from the bottom face of the desk top and presenting a surface which prevents a secure hold upon said member, thus cooperating with said stop means in preventing said member from being forced out of locked relation with said top member.

14. An inkwell comprising a bottom member having a hollow body for receiving the ink, a reduced neck extending upwardly therefrom, a top member including a top wall which covers the margin of said neck portion and has a hole registering with said neck to afford access to the ink in said bottom member, and a tubular part on said top wall coincident with said hole therein and which depends into and fits said neck, whereby the passage of ink upwardly out of said neck is prevented, and means for securing said members together.

15. An inkwell for mounting in a hole in a desk top and comprising a bottom section forming a receptacle for ink, and a top section carrying a key controlled locking means adapted to engage a part of said bottom section within the hole in the desk top, said bottom section engaging said desk top to prevent upward movement thereof through the hole in the desk top and the top section engaging the desk top to prevent downward movement thereof, whereby said parts, when locked together, are held against movement out of said hole in the desk top.

16. An inkwell constructed to be supported in a hole in a desk top or the like, said inkwell comprising a top member and a bottom member formed to be inserted into said hole from the upper and lower sides respectively of said desk top, a laterally projecting part on one of said members, and locking means on said other member comprising resilient members mounted on said last mentioned member and which are adapted to yield upon engagement of said laterally projecting part therewith to permit the passage of said laterally projecting part past said resilient members, and then return to their original position to lock said top and bottom members together.

17. An inkwell constructed to be locked into a hole in a desk top, including a lower member constituting a container for the ink, an upper member, and a locking connection between said members for locking said members to each other to prevent separation of said members, each member engaging a portion of the desk top to prevent removal of the same from said desk top when said members are locked together.

18. An inkwell constructed to be locked into a hole in a desk top, including a lower member constituting a container for the ink and having a neck adapted to be inserted into said hole and terminating at its lower end in a substantially flat part adapted to engage the under face of a desk top, said lower member having a convex bottom wall joining said flat part at an acute angle, to form a lower face which will tend to deflect downwardly any articles moved in a substantially horizontal direction against the same, and a top member constructed to enter into said hole to a limited extent and to form a locking engagement with said neck portion.

19. An inkwell constructed to be locked into a hole in a desk top, including a lower member constituting a container for the ink, and having a part arranged to enter into said hole to a limited extent from the bottom thereof, a top member adapted to enter said hole from the top thereof to a limited extent, and locking means carried by one of said members and engaging the other member to lock said members to each other and thus prevent movement of the same out of said hole.

GEORGE B. LAUTZ, Jr.